United States Patent
Jeng

(10) Patent No.: US 6,695,331 B2
(45) Date of Patent: Feb. 24, 2004

(54) KINETIC ENERGY GENERATING MECHANISM

(76) Inventor: Fu-shen Jeng, 5Fl., No. 32, Sec. 1, Huanhe E. Rd., Yunghe City, Taipei Hsien (TW)

(*) Notice: Subject to any disclaimer, the term of this patent is extended or adjusted under 35 U.S.C. 154(b) by 0 days.

(21) Appl. No.: 10/175,003

(22) Filed: Jun. 20, 2002

(65) Prior Publication Data

US 2003/0234507 A1 Dec. 25, 2003

(51) Int. Cl.7 .................................................. B62M 1/00
(52) U.S. Cl. ....................... 280/228; 280/214; 280/220; 280/221
(58) Field of Search ............................... 280/200, 214, 280/220, 221, 228

(56) References Cited

U.S. PATENT DOCUMENTS

| | | | | |
|---|---|---|---|---|
| 3,332,704 A | * | 7/1967 | McVicker | 280/228 |
| 4,334,695 A | * | 6/1982 | Ashby | 280/228 |
| 4,614,337 A | * | 9/1986 | Schonenberger | 482/54 |
| 5,496,049 A | * | 3/1996 | Escobedo | 280/238 |
| 6,505,845 B1 | * | 1/2003 | Fong | 280/228 |
| 6,511,087 B1 | * | 1/2003 | Fong | 280/228 |

* cited by examiner

Primary Examiner—Lesley D. Morris
Assistant Examiner—L. Lum
(74) Attorney, Agent, or Firm—Bacon & Thomas, PLLC

(57) ABSTRACT

A kinetic energy generating mechanism includes a driving part, a transmission part, and a driven part. The driving part includes front and rear rollers separately mounted on a vehicle, and an actuating belt wound around the front and rear rollers. The transmission part is a transmission gear mounted to an end of the rear roller to rotate along with the same. The driven part is a driven gear mounted on a rear axle of the vehicle and meshing with the transmission gear, or may include front and rear driven gears wound around by a chain to mesh with the transmission part and mount on the rear axle of the vehicle, respectively. When a user walks or runs on the actuating belt, the latter rotates the front and the rear roller counterclockwise, and the driven part meshed with the transmission part is rotated clockwise to move the vehicle forward.

8 Claims, 7 Drawing Sheets

$A = F \times \sin(\theta)$
$B = F \times \cos(\theta)$
$C = F \times \cos(\theta) \times \sin(\theta)$
$D = F \times \cos(\theta)^2$
$A + C = F \times \sin(\theta) \times (1 + \cos(\theta))$

KINETIC ENERGY GENERATING MECHANISM

FIELD OF THE INVENTION

The present invention relates to a kinetic energy generating mechanism, and more particularly to a kinetic energy generating mechanism that is mounted on a vehicle and generates kinetic energy to move the vehicle forward when a user walks or runs on an actuating belt of the mechanism.

BACKGROUND OF THE INVENTION

A conventional bicycle of prior art normally found in the market is moved forward through circular motions of two pedals thereof actuated by a cyclist's two feet. That is, a force applied by the cyclist's two feet on the pedals is converted into a kinetic energy to move the bicycle forward. Basically, such conventional kinetic energy generating mechanism employed on the bicycle has three major drawbacks: (a) the force applied by the cyclist's two feet is transferred to the pedals and converted into kinetic energy to move the bicycle forward only when the pedals are located at positions between 90 degrees and 270 degrees in the circular motion, as shown in FIG. 1; (b) the pedals transfer the applied force in a high efficiency of transmission only when they are located at positions between 45 degrees and 315 degrees, as shown in FIG. 2; and (c) the cyclist usually sits on a saddle of the bicycle to rotate the pedals with two feet and can therefore apply only a rather small force on the pedals to drive the bicycle forward. Generally speaking, the force that can be applied by the two feet is only about a quarter of the cyclist's weight.

The inventor has conducted many researches on the basic principle for moving a vehicle forward and found from the research results that when a vehicle provides at a top with an inclined plane containing an angle θ between it and the ground surface and has wheels mounted to a horizontal bottom thereof, as shown in FIG. 3, a total force applied by a user walking or running on the inclined plane of the vehicle includes the user's weight and a kinetic force generated by the user through walking or running on the inclined plane. Given that the total applied force is F and according to the kinetics, F can be decomposed into two applied forces A and B. The applied force A has a magnitude of Fxsin(θ), and the applied force B has a magnitude of Fxcos(θ). The applied force A would cause the user to slip downward on the inclined plane on the vehicle. With a properly designed kinetic energy generating mechanism, the applied force A could be converted into a kinetic energy to move the vehicle forward. The applied force B is mainly applied on the vehicle and can be decomposed into two applied forces C and D. The applied force C has a magnitude of Fxcos(θ)xsin(θ), while the applied force D has a magnitude of Fxcos(θ)². The applied force C directly moves the vehicle forward, and the applied force D is absorbed by the ground via the wheels of the vehicle.

In conclusion, the vehicle is moved forward by a total kinetic energy from the applied forces A and C, that is, a force having a magnitude of Fxsin(θ)x(1+cos(θ)). When the angle θ is 30 degrees, the total kinetic energy moving the vehicle forward is about 0.9330xF, and when the angle θ is 45 degrees, the total kinetic energy moving the vehicle forward is about 1.2071xF. In other words, when a user of 60 kgs in weight walks or runs on the inclined plane having an inclination angle θ of 30 degrees, a force larger than 55.98 kgs would be applied on the vehicle to move the same forward; and when a user of 60 kgs in weight walks or runs on the inclined plane having an inclination angle θ of 45 degrees, a force larger than 72.426 kgs would be applied on the vehicle to move the same forward.

The above-mentioned applied force capable of moving the vehicle forward is about four times as large as the applied force that could be applied by the cyclist on the pedals to move the bicycle forward. Moreover, unlike the kinetic energy generating mechanism for the conventional bicycle, that is, the two pedals, which is in a low-efficiency, attenuated, or idle state in almost one half of the action period thereof, the above-mentioned applied force for moving the vehicle forward can always be maintained at stable magnitude and transmission efficiency. In brief, it is found by the inventor a properly designed kinetic energy generating mechanism could generate kinetic energy for moving a vehicle forward at least eight times as large as that could be generated with the conventional bicycle.

Therefore, it would be desirable to develop a kinetic energy generating mechanism based on the above-described principle to generate relatively high kinetic energy to move a vehicle forward with reduced efforts made by a user.

SUMMARY OF THE INVENTION

A primary object of the present invention is to provide a kinetic energy generating mechanism that is mounted on a vehicle and uses force applied by a user walking or running on an actuating belt of the mechanism to generate kinetic energy sufficient for moving the vehicle forward. Since all the force applied by the user is converted into the kinetic energy, the vehicle can be easily moved forward with reduced efforts made by the user.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
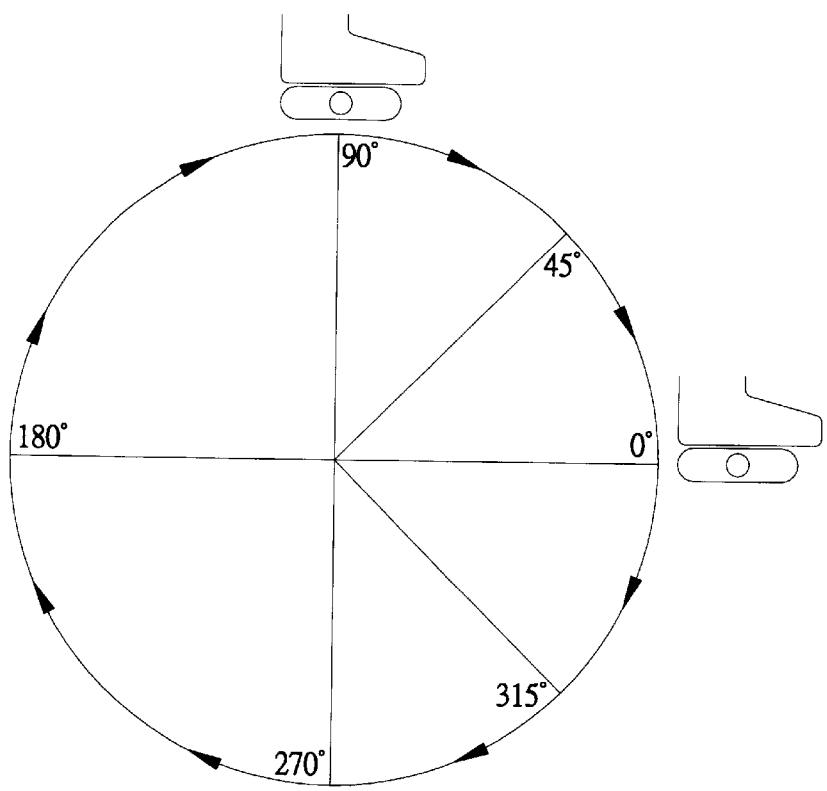
FIG. 1 shows the circular motion of a pedal of a prior art bicycle.
Figure 2:
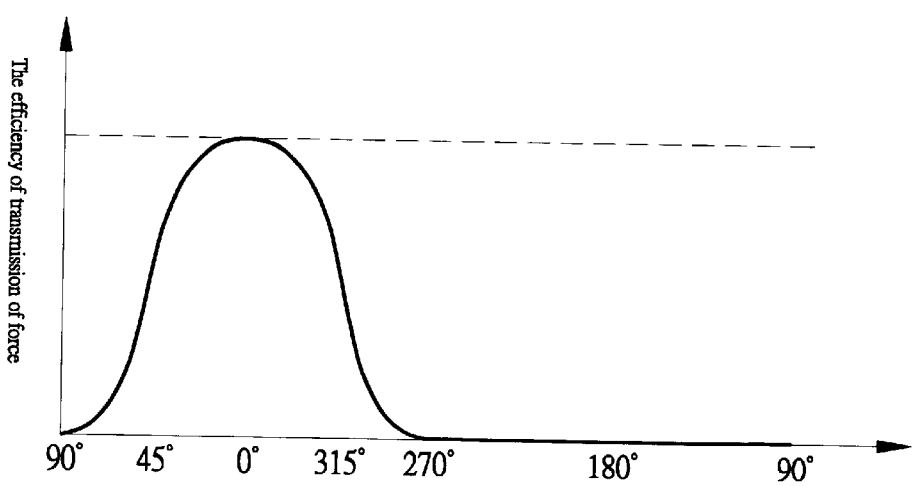
FIG. 2 is a curve showing the efficiency of transmission of force applied by a cyclist via pedals of a prior art bicycle.
Figure 3:
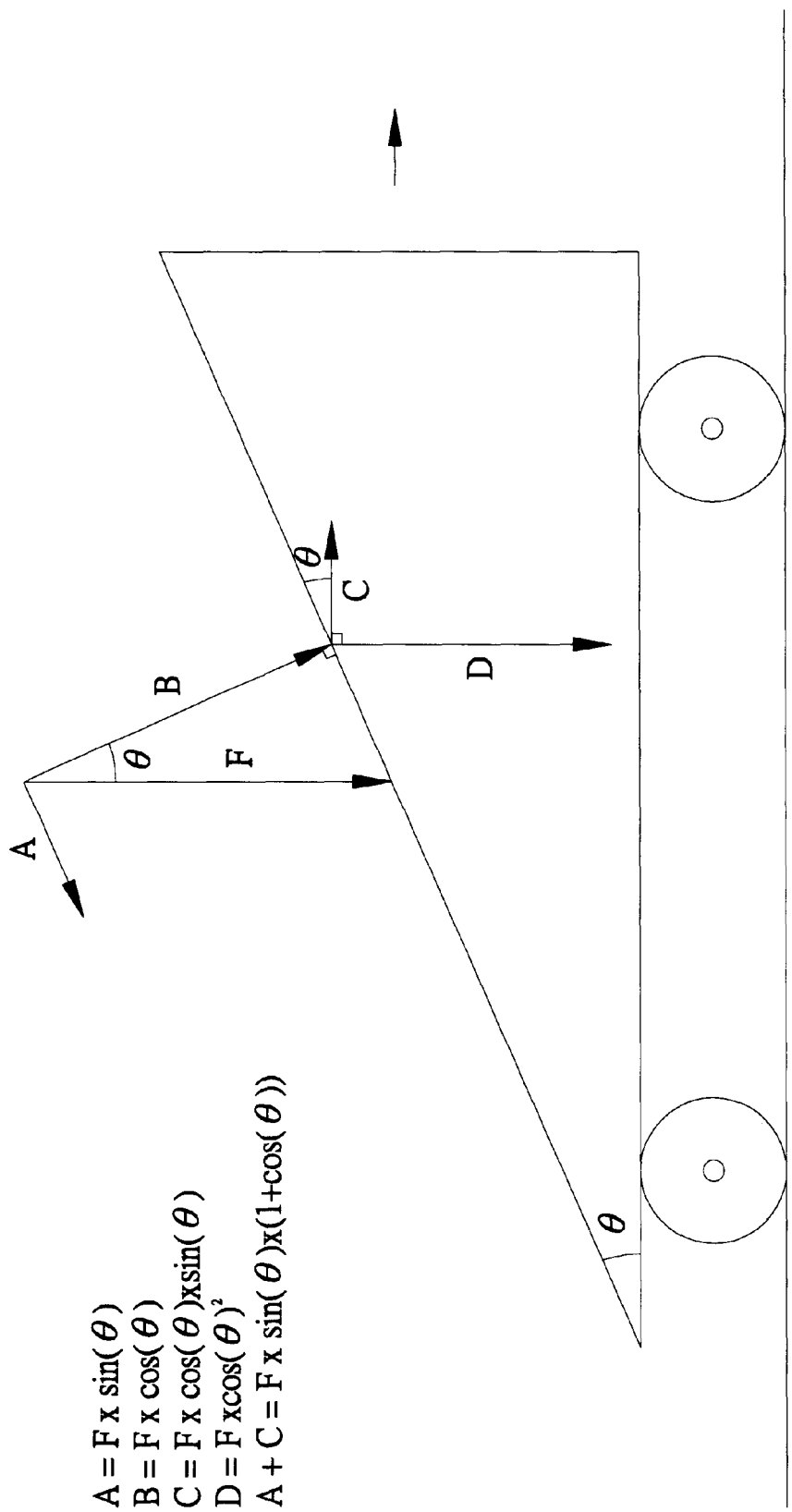
FIG. 3 analyzes the force applied by a user on the present invention.
Figure 4:
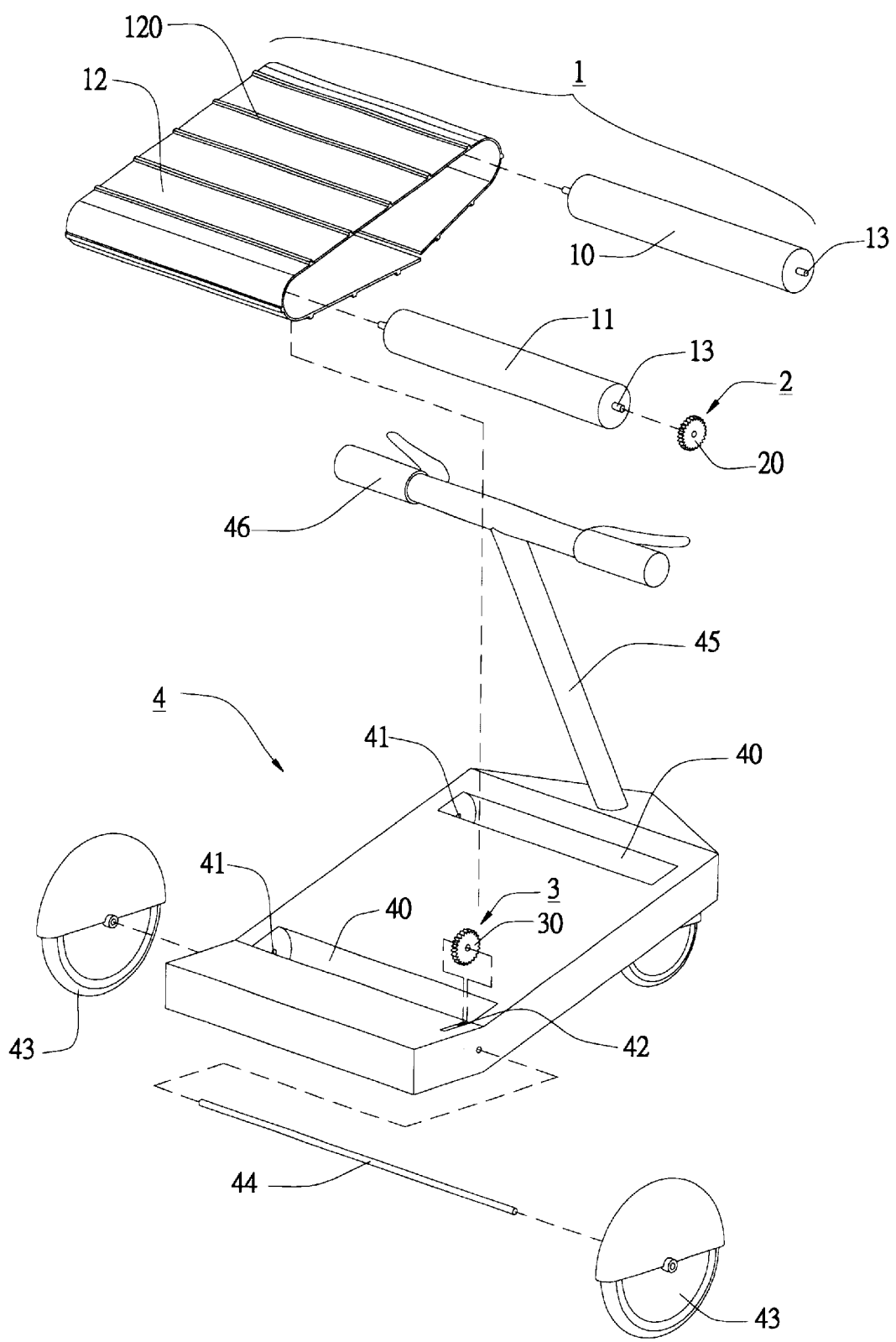
FIG. 4 is an exploded perspective view of a first embodiment of the present invention.
Figure 5:
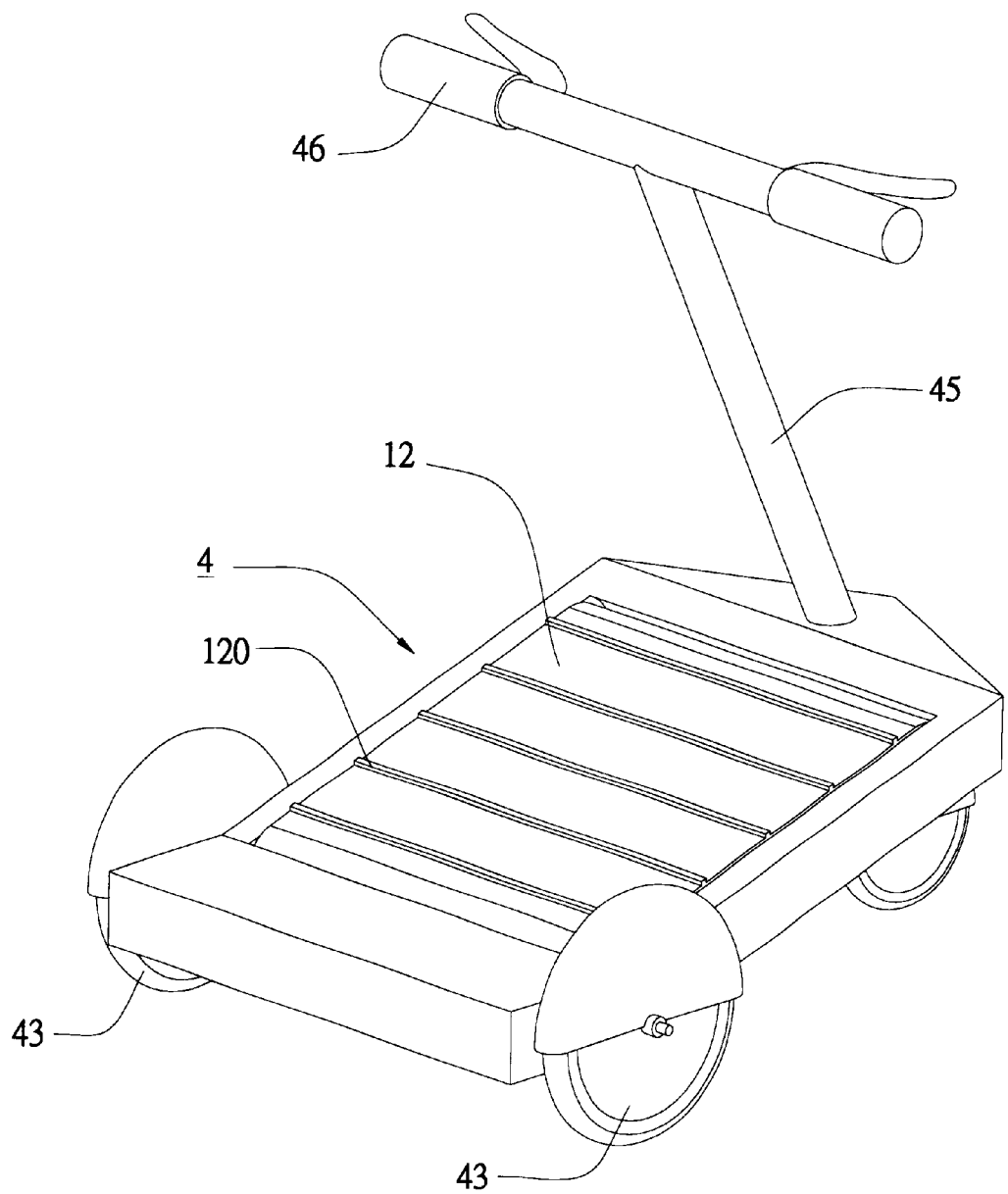
FIG. 5 is an assembled perspective view of FIG. 4.

Please refer to FIGS. 4 and 5 that are exploded and assembled perspective views, respectively, of a kinetic energy generating mechanism according to a first embodiment of the present invention for mounting on a vehicle 4 to move the latter forward. As shown, the kinetic energy generating mechanism mainly includes a driving part 1, a transmission part 2, and a driven part 3.

The driving part 1 includes a front roller 10, a rear roller 11, and an actuating belt 12. The front and the rear roller 10, 11 are separately mounted in two recesses 40 provided on the vehicle 4 by engaging shafts projected from two ends of the front and the rear roller 10, 11 with mounting holes 41 correspondingly provided at end surfaces of the recesses 40. The actuating belt 12 is wound around the front and the rear roller 10, 11 with two ends of the belt 12 firmly connected together to form an endless belt. The actuating belt 12 provides a top surface adapted for a user's two feet to stand thereon.

The transmission part 2 includes a transmission gear 20 mounted on one of the shafts 13 projected from two ends of the rear roller 11 to rotate along with the rear roller 11.

The driven part 3 includes a driven gear 30 mounted in a slot 42 provided near a rear end of the vehicle 4, such that the driven gear 30 is mounted on a rear axle 44 of two rear wheels 43 of the vehicle 4 and meshes with the transmission gear 20.

Figure 6:
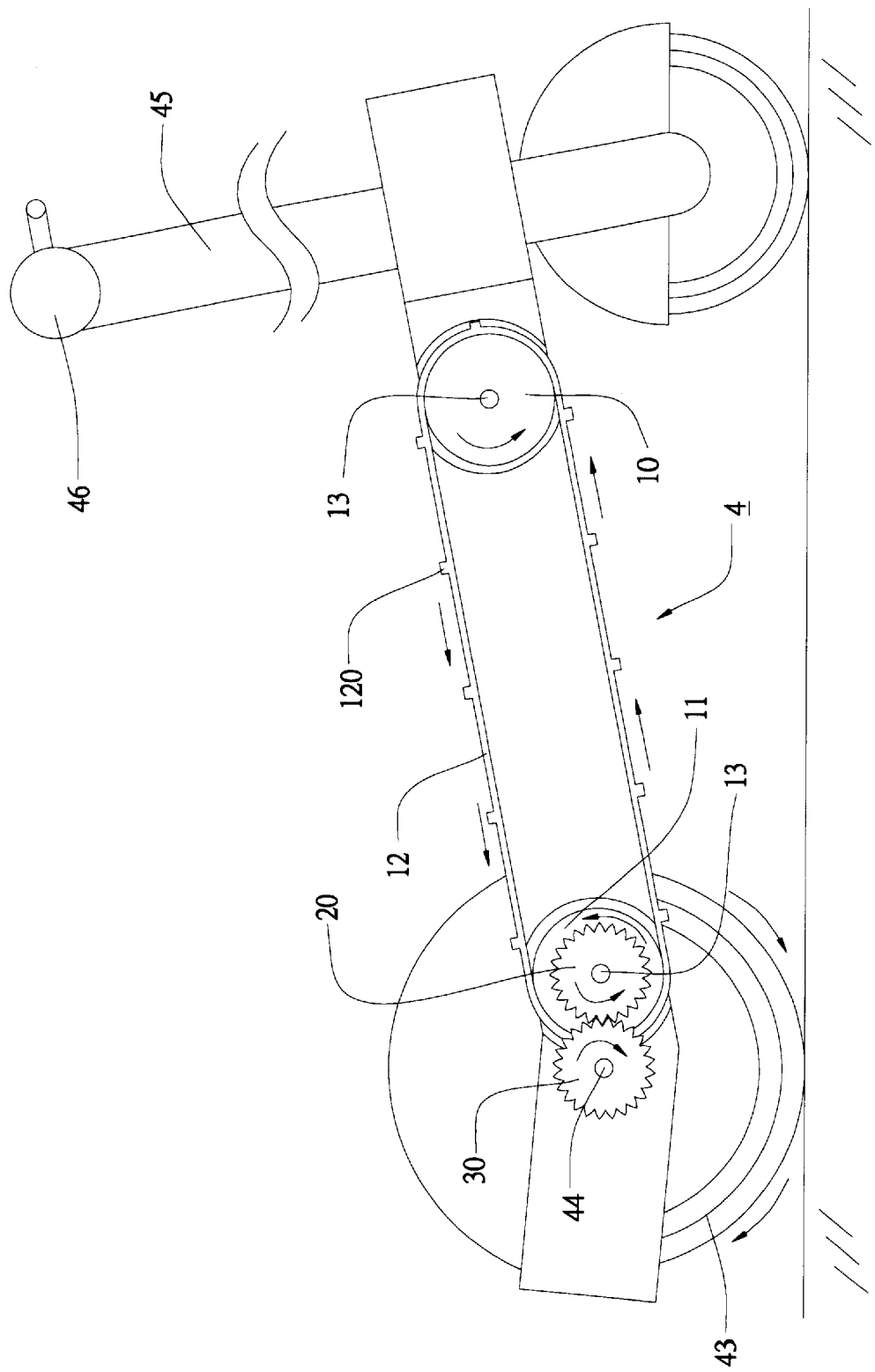
FIG. 6 shows the operation of the first embodiment of the present invention.

Please refer to FIG. 6. When a user (not shown) standing on the actuating belt 12 grips at two handlebars 46 provided on a steering stem 45 of the vehicle 4 and walks or runs forward on the actuating belt 12, the actuating belt 12 is caused to drive the front and the rear roller 10, 11 to rotate counterclockwise. At this point, the transmission gear 20 mounted on the shaft 13 of the rear roller 11 rotates counterclockwise at the same time and brings the driven gear 30 meshing therewith to rotate clockwise. Since the rear wheels 43 of the vehicle 4 and the driven gear 30 are coaxial with one another (that is, they are all mounted on the rear axle 44) the rear wheels 43 are brought by the driven gear 30 to rotate clockwise and therefore move the vehicle 4 forward.

On a basis of identical tooth pitch, the driven gear 30 may be designed to have fewer teeth than the transmission gear 20 so as to have a rotating speed larger than that of the transmission gear 20. In this manner, the rear wheels 43 may have increased rotating speed and the user could manipulate the vehicle 4 with reduced efforts made by the user.

Figure 7:
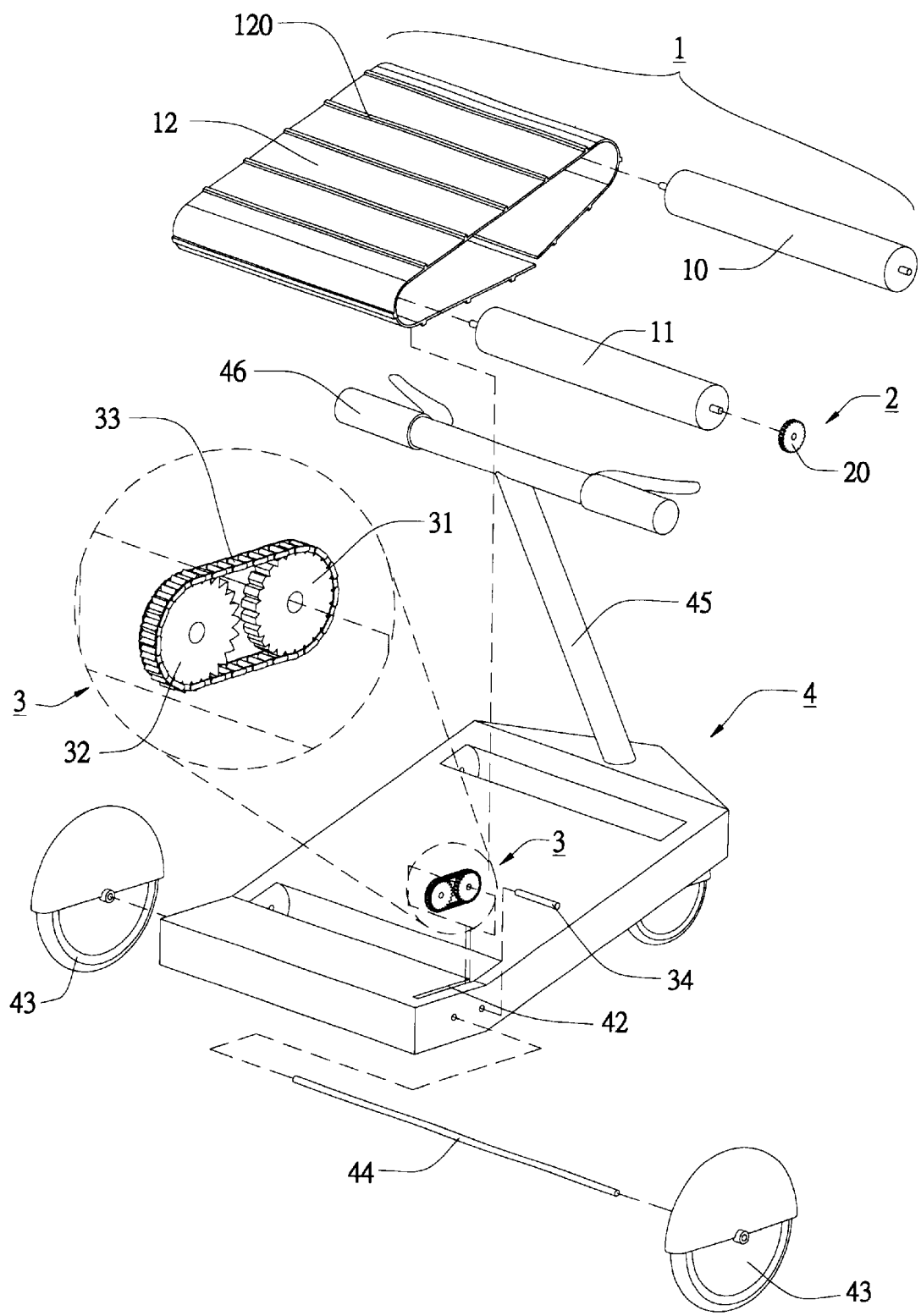
FIG. 7 is an exploded perspective view of a second embodiment of the present invention.

FIG. 7 is an exploded perspective view of a second embodiment of the present invention. The second embodiment is generally similar to the first embodiment, except it has a driven part 3 including a front driven gear 31, a rear driven gear 32, and a chain 33. The chain 33 is wound around the front and the rear driven gear 31, 32, and the entire driven part 3 is received in the slot 42 provided near the rear end of the vehicle 4. The front driven gear 31 is fixed in the slot 42 with a shaft 34 to mesh with the transmission gear 20. The rear driven gear 32 is mounted on the axle 44 of the rear wheels 43.

Figure 8:
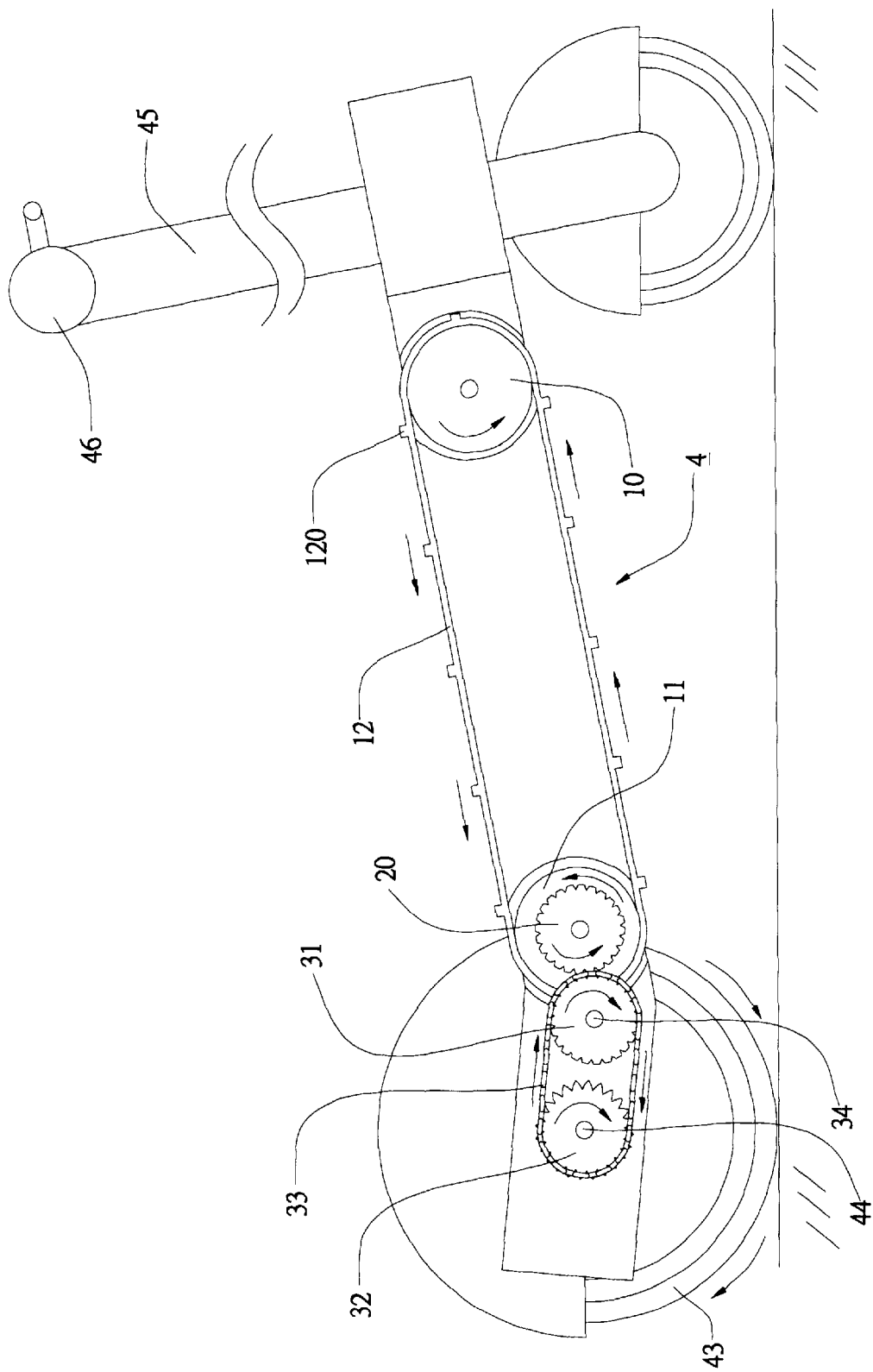
FIG. 8 shows the operation of the second embodiment of the present invention.

Please refer to FIG. 8. When a user (not shown) standing on the actuating belt 12 grips at two handlebars 46 provided on a steering stem 45 of the vehicle 4 and walks or runs forward on the actuating belt 12, the actuating belt 12 is caused to drive the front and the rear roller 10, 11 to rotate counterclockwise. At this point, the transmission gear 20 mounted on the shaft 13 of the rear roller 11 rotates counterclockwise at the same time and brings the front driven gear 31 meshing therewith to rotate clockwise, and the rear driven gear 32 is brought by the front driven gear 31 via the chain 33 to rotate clockwise at the same time. Since the rear wheels 43 of the vehicle 4 and the rear driven gear 32 are coaxial with one another (that is, they are all mounted on the rear axle 44), the rear wheels 43 are brought by the rear driven gear 32 to rotate clockwise and therefore move the vehicle 4 forward.

Again, on the basis of identical tooth pitch, the front driven gear 31 may be designed to have fewer teeth than the transmission gear 20 so as to rotate faster than the transmission gear 20. In this manner, the rear wheels 43 of the vehicle 4 may have increased rotating speed and the user could manipulate the vehicle 4 with reduced efforts made by the user.

A derailleur or gearbox (not shown) may be mounted at the rear driven gear 32 of the driven part 3 to facilitate convenient self-adjustment of rotating speed of the rear wheels 43, so that the vehicle 4 may be moved forward with even reduced efforts made by the user.

As can be seen from the drawings, the actuating belt 12 for the above-mentioned two embodiments of the present invention is provided at its outer surface with a plurality of spaced ribs 120 to increase a contact area between the user's feet and the actuating belt 12 as well as to provide an anti-slipping effect.

In both embodiments, the transmission part 2 is not limited to mount on the rear roller 11. That is, the transmission part 2 may also be otherwise mounted on the front roller 10 to provide a front drive vehicle 4. Moreover, numbers of the transmission part 2 and the driven part 3 meshing therewith are not limited to one. That is, more than one set of transmission part 2 and driven part 3 may be provided for the vehicle 4.

The present invention has been described with some preferred embodiments thereof and it is understood that many changes and modifications in the described embodiments can be carried out without departing from the scope and the spirit of the invention as defined by the appended claims.

What is claimed is:

1. A kinetic energy generating mechanism, comprising:
   a driving part including a front and a rear roller separately mounted on a body of a vehicle, and an endless actuating belt wound around said front and rear rollers; and said actuating belt providing a top surface on which a user may stand, walk or run;
   a transmission part including a transmission sear mounted to an end of said rear roller of said driving part to rotate along with said rear roller;
   a driven part including a driven gear mounted on a rear axle of said vehicle and meshing with said transmission gear;
   said actuating belt being adapted to rotate said front and said rear roller when a user walks or runs on said actuating belt, and thereby causing said transmission part mounted on said rear roller to synchronously rotate said driven part in a reverse direction and thereby move said vehicle forward; and
   wherein said front and said rear roller are mounted in two recesses provided on the body of said vehicle, and are provided at two ends with outward projected shafts, said shafts separately engaging with mounting holes provided at end surfaces of said recesses to fix said front and rear rollers in place in said recesses.

2. The kinetic energy generating mechanism as claimed in claim 1, wherein said driven gear has a tooth pitch identical to that of said transmission gear but fewer teeth than said transmission gear, so as to rotate faster than said transmission gear to enable the user to move said vehicle forward at an increased speed with reduced efforts.

3. The kinetic energy generating mechanism as claimed in claim 1, wherein said actuating belt is provided at an outer surface with a plurality of spaced ribs to increase a contact area between the user's feet and said actuating belt as well as to provide an anti-slipping effect.

4. A kinetic energy generating mechanism, comprising:

a driving part including a front and a rear roller separately mounted on a body of a vehicle, and an endless actuating belt wound around said front and rear rollers; and said actuating belt providing a top surface on which a user may stand, walk or run;

a transmission part including a transmission gear mounted to an end of said rear roller of said driving part to rotate along with said rear roller; and a driven part including a front driven gear, a rear driven gear, and a chain wound around said front and rear driven gears; said front driven gear being meshed with said transmission gear, and said rear driven gear being mounted on a rear axle of said vehicle; and said actuating belt being adapted to rotate said front and said rear roller when a user walks or runs on said actuating belt, and thereby causing said transmission part mounted on said rear roller to synchronously rotate said driven part in a reverse direction and thereby move said vehicle forward.

5. The kinetic energy generating mechanism as claimed in claim 4, wherein said front and said rear roller are mounted in two recesses provided on the body of said vehicle, and are provided at two ends with outward projected shafts, said shafts separately engaging with mounting holes provided at end surfaces of said recesses to fix said front and rear rollers in place in said recesses.

6. The kinetic energy generating mechanism as claimed in claim 4, wherein said front driven gear has a tooth pitch identical to that of said transmission gear but fewer teeth than said transmission gear, so as to rotate faster than said transmission gear to enable the user to move said vehicle forward at an increased speed with reduced efforts.

7. The kinetic energy generating mechanism as claimed in claim 4, further comprises a derailleur mounted at said rear driven gear to facilitate convenient self-adjustment of a rotational speed of rear wheels secured to the rear axle of said vehicle, so that said vehicle may be moved forward by the user.

8. The kinetic energy generating mechanism as claimed in claim 4, wherein said actuating belt is provided at an outer surface with a plurality of spaced ribs to increase a contact area between the user's feet and said actuating belt as well as to provide an anti-slipping effect.

* * * * *